United States Patent
Burger et al.

(10) Patent No.: US 10,155,329 B2
(45) Date of Patent: Dec. 18, 2018

(54) METHOD FOR DECORATING PLASTIC PARTS

(71) Applicant: LEONHARD KURZ Stiftung & Co. KG, Furth (DE)

(72) Inventors: Harald Burger, Nuremberg (DE); Martin Hahn, Herrieden (DE)

(73) Assignee: LEONHARD KURZ STIFTUNG & CO. KG, Furth (DE)

( * ) Notice: Subject to any disclaimer, the term of this patent is extended or adjusted under 35 U.S.C. 154(b) by 0 days.

(21) Appl. No.: 15/285,121

(22) Filed: Oct. 4, 2016

(65) Prior Publication Data

US 2017/0021536 A1    Jan. 26, 2017

Related U.S. Application Data

(62) Division of application No. 13/256,576, filed as application No. PCT/EP2010/001578 on Mar. 12, 2010.

(30) Foreign Application Priority Data

Mar. 16, 2009 (DE) ........................ 10 2009 013 065

(51) Int. Cl.
   B29C 45/14    (2006.01)
   B29K 25/00    (2006.01)

(52) U.S. Cl.
   CPC .. B29C 45/14008 (2013.01); B29C 45/14262 (2013.01); B29C 45/14418 (2013.01); *B29C 2045/14188* (2013.01); *B29K 2025/06* (2013.01)

(58) Field of Classification Search
   None
   See application file for complete search history.

(56) References Cited

U.S. PATENT DOCUMENTS 2,965,932 A   12/1960 Knowles
3,176,057 A    3/1965 Peters et al.
(Continued)

FOREIGN PATENT DOCUMENTS

DE    3434366    8/1985
DE    4033297    5/1995
(Continued)

*Primary Examiner* — Edmund H Lee
(74) *Attorney, Agent, or Firm* — Hoffman & Baron, LLP (57) ABSTRACT

There is described an apparatus for performing the in-mold decoration method with an injection tool (1). The injection tool (1) has a first tool portion (11) having a first mold recess (13) and a second tool portion (12) having a second mold recess (15) corresponding to the first mold recess. The second tool portion (12) has at least one injection passage (12e), wherein a portion of an endless decorative film (16) can be arranged between the first tool portion (11) and the second tool portion (12). The mold recess (13) of the first tool portion (11) has a raised edge region (14) extending in a closed configuration around the mold recess (13) and having an end face (14s) which is flattened or rounded or pointed in cross-section. The second tool portion (12) has a corresponding end face (12s) parallel to the end face (14s) of the raised edge region (14). When the injection tool (1) is closed there is a spacing (s) between the end face (14s) of the raised edge region (14) of the first tool portion (11) and the corresponding end face (12s) of the second tool portion (12) at least over a subregion, wherein the spacing is sealed by the decorative film (16). A method for same is further described.

7 Claims, 3 Drawing Sheets

(56) References Cited

U.S. PATENT DOCUMENTS

| | | | |
|---|---|---|---|
| 3,523,474 A * | 8/1970 | Kinslow, Jr. | B29C 51/445 |
| | | | 264/153 |
| 3,651,191 A | 3/1972 | Glatt et al. | |
| 4,639,341 A | 1/1987 | Hanamoto et al. | |
| 4,686,076 A | 8/1987 | Dromingly et al. | |
| 4,702,787 A | 10/1987 | Ruskin et al. | |
| 4,728,477 A | 3/1988 | Dromigny | |
| 5,037,595 A | 8/1991 | Kornelis | |
| 5,154,872 A | 10/1992 | Masui et al. | |
| 5,238,640 A | 8/1993 | Masui et al. | |
| 5,525,283 A * | 6/1996 | Nicolay | B29C 43/145 |
| | | | 264/255 |
| 5,593,631 A | 1/1997 | Hara et al. | |
| 5,599,608 A * | 2/1997 | Yamamoto | B29C 43/021 |
| | | | 156/233 |
| 5,679,301 A | 10/1997 | Miklas et al. | |
| 6,207,090 B1 * | 3/2001 | Knisely | B29C 43/021 |
| | | | 264/138 |
| 6,343,918 B1 * | 2/2002 | Atake | B29C 45/1418 |
| | | | 264/266 |
| 6,382,949 B1 | 5/2002 | Matsumoto et al. | |
| 2008/0143017 A1 | 6/2008 | Hoogland | |

FOREIGN PATENT DOCUMENTS

| | | |
|---|---|---|
| DE | 10126991 | 12/2002 |
| DE | 102006016669 | 10/2007 |
| EP | 1886788 | 2/2008 |
| FR | 2827805 | 1/2003 |
| FR | 2735063 | 12/2006 |
| FR | 2777497 | 10/2009 |
| JP | S62170310 | 7/1987 |
| JP | S6315717 | 1/1988 |
| JP | S6399913 | 5/1988 |
| JP | 01067317 | 3/1989 |
| JP | 0250319 | 4/1990 |
| JP | H2176781 | 7/1990 |
| JP | 4135818 A | 5/1992 |
| JP | H4176781 | 6/1992 |
| JP | 0501769 | 2/1993 |
| JP | H81719 | 1/1996 |
| KR | 100222025 | 1/1992 |
| KR | 1020080058881 | 6/2008 |
| TW | 200734155 | 9/2007 |
| WO | WO9304837 | 3/1993 |
| WO | WO0030827 | 6/2000 |

* cited by examiner

METHOD FOR DECORATING PLASTIC PARTS

This application is a divisional application of U.S. application Ser. No. 13/256,576, filed on Oct. 25, 2011, now abandoned, which claims priority based on an International Application filed under the Patent Cooperation Treaty, PCT/EP2010/001578, filed on Mar. 12, 2010 and German Application No. DE 102009013065.9, filed on Mar. 16, 2009.

BACKGROUND OF THE INVENTION

The invention concerns an apparatus for and a method of decorating plastic parts.

The in-mold decoration method is known for decorating plastic parts, which is distinguished in that injection and decoration of the plastic part can be performed in one working step. In that way plastic parts can be permanently decorated, possibly including plastic parts with uneven surfaces, for example structures, reliefs and of complicated geometry. A method of decorating injection-molded plastic parts is referred to as in-mold decoration, in which a decorative film is placed in an injection mold and plastic material is then injected therebehind. Conventionally the decorative film is stamped out and possibly pre-shaped before being placed in the injection mold, if surfaces of the injection-molded plastic part which are not flat or parts of complicated geometries are to be decorated. In preferred embodiments, only layers of the decorative film, that are applied to the decorative film, are transferred onto the injection-molded plastic part, for example a print image, that is to say one or more color layers which can be arranged on a transparent protective layer, wherein after the transfer operation the protective layer lies over the one or more color layers.

WO 93/04837 describes a process for the production of a plastic article decorated with a decoration of a stamping film. A plastic deadhead required for injection of plastic material into the mold is separated from the plastic article before the plastic material hardens.

WO 00/30827 describes a method in which a film strip is printed upon and divided into detachable portions by previous perforation. The film strip is fed to an injection mold and the portions are definitively cut out of the film strip during the injection process.

FR 2 735 063 describes an injection mold having a cutting tool which, when the mold is closed, severs a portion required for decoration, out of a decorative film, in the manner of a stamping operation.

SUMMARY OF THE INVENTION

The object of the invention is to provide an improved apparatus for and an improved method of in-mold decoration.

That problem is attained with the subject-matter of the main apparatus claim 1. This involves an apparatus for performing an in-mold decoration method comprising an injection tool, wherein the injection tool has a first tool portion having a first mold recess and a second tool portion and the second tool portion or the first tool portion has at least one injection passage, wherein a portion of a decorative film preferably in the form of an endless decorative film can be arranged between the first tool portion and the second tool portion, wherein it is provided that the mold recess of the first tool portion has a raised edge region extending in a closed configuration around the mold recess and having an end face which is flattened or rounded or pointed in cross-section, the second tool portion has an end face corresponding to the end face of the raised edge region, and when the injection tool is closed there is a spacing between the end face of the raised edge region of the first tool portion and the corresponding end face of the second tool portion at least over a subregion, wherein the spacing is sealed by the decorative film.

The proposed apparatus is distinguished in that the tool wear of the tool which is integrated in the injection mold is reduced. Because the two hardened tool portions do not come into contact in the region of the end face of the continuously extending raised edge region of the first tool portion or at least not over the entire peripherally extending edge region, the service life of the tool is increased. At the same time, it is also possible to achieve a reduction in the cycle time and an increase in the number of cycles when using the apparatus in the production process. When the injection tool is closed the decorative film is pinched or squeezed and in that case can be partially or completely severed. Severing can also be effected in the form of a shearing effect in conjunction with pinching. It is however not absolutely necessary for the decorative film to be severed at all when the injection tool is closed. Rather, it is essential that, when the injection tool is closed, a gap remains at least region-wise between the first tool portion and the second tool portion, in which gap the decorative film is compressed, that is to say pinched, and the gap is sealed off by the decorative film arranged in a compressed condition therein. In that respect the gap is sealed to such an extent that, upon injection of the plastic melt, the gap is sealingly closed and no plastic melt passes out through the gap.

In an advantageous development it can be provided that when the injection tool is closed the gap width, that is to say the spacing of the end face of the raised edge region and the corresponding end face of the second tool portion, is less than 50% of the thickness of the provided decorative film and is preferably between 20% and 10% of the thickness. It is advantageously determined by tests, what spacing is the optimum spacing in dependence on the selected material of the decorative film and the material properties dependent thereon. The gap width of the injection tool and thus the residual thickness of the decorative film can be so small that the decorative film can be cut with accurately defined contours after hardening of the injection-molded plastic part.

It can be provided that the gap width is in the range of between 20 μm and 50 μm. Spacings of less than 20 μm can be implemented only with a high level of production complication and expenditure, in which respect moreover it is to be taken into account that the tool portions can suffer distortion in use thereof so that, if the minimum spacing fails markedly below 20 μm, the tool portions can at least partially come into contact with each other.

The raised edge region extending around the mold recess can be in the form of a ring-shaped edge region in the form of a circular ring, or a closed ring shape of another form, that is to say as a continuously extending edge region of any peripherally extending contour. The circular ring shape is afforded if the injection portion is of a circular shape in its outside contour at least in the region of the decoration.

It can be provided that the first tool portion having the mold recess is in the form of a movable mold insert. The installation dimensions depend inter alia on the installation conditions of the injection tool or the injection machine, the movable mold insert preferably being in the form of an interchangeable mold insert.

It can further be provided that the second tool portion is in the form of a fixed mold insert. That second tool portion can preferably have the injection passage. In addition the second tool portion can also have a mold recess which corresponds to the first mold recess in the first mold portion, that is to say, when the injection tool is closed, it forms a common mold cavity, with the first mold recess. The installation dimensions of the first and second tool portions depend inter alia on the installation conditions of the injection tool or the injection machine, wherein the fixed mold insert is preferably in the form of an interchangeable mold insert. One or both of the mold inserts or the injection tool can have one or more abutments which upon closure of the mold inserts or the injection tool set the spacing between the end face of the raised edge region of the first tool portion and the corresponding end face of the second tool portion. The decorative film which is placed in the injection tool can be passed through between the abutments. It can however also be provided that the decorative film is used to set the spacing between the end face of the raised edge region of the first tool portion and the corresponding end face of the second tool portion, as the pressure in relation to surface area can be so small, outside the end face region, that the decorative film withstands the closing pressure of the injection tool without noticeable deformation.

In the case of edge regions of a simple contour, for example in the shape of a circular ring as referred to above, the edge region with the end face can be in the form of a separately interchangeable part. In that way it is possible, when the end face is worn, to replace only that part of the mold insert whereby it is possible to achieve a cost saving.

The injection tool can have a plurality of mold inserts in the first and second tool portions, the mold inserts being in the form of pairs of corresponding mold inserts. In that case the mold inserts can all be identical or also different. The mold inserts can be arranged in a matrix, for example in the form of 3×3, 8×8 or also 7×8 or 6×9 mold inserts. One or more of those mold inserts can be of such a configuration that test pieces are produced therein, which are especially adapted to be able to assess the quality (register accuracy of the decoration, edge or surface quality) of the parts produced with the other mold inserts. By way of example those test pieces can have a decoration of an especial configuration and/or can be of a special shape.

The apparatus according to the invention can be so designed that it is operable continuously insofar as in preferred configurations it is provided that the decorative film can be supplied by way of a film transport device and is in the form of a roll item. As is known per se from mass production, it is possible to operate with a roll-to-roll procedure.

It can be provided that the decorative film is a strip-shaped endless film which is arranged on a supply roll and engages through the injection tool.

It can further be provided that arranged downstream of the injection tool is a winding-off roll on which the residual decorative film is wound.

The decorative film and/or the winding-on roll can advantageously cooperate with a transport device in such a way that the decorative film is passed through between a driven roller and a pressure roller and that the supply roll is braked. It can further be provided that there is second transport device for the winding-on roll, preferably being integrated therein, wherein the winding-on roll can be connected for example by way of a slipping clutch to the second transport device. It is however also possible that only the second transport device is provided and the supply roll is braked to set a strip tension.

It can also be provided that the film transport device and/or the winding-on roll is in the form of a device cooperating with optical markings and/or mechanical markings. That means that the decorative film has optical and/or mechanical markings or register marks cooperating with the transport device for the decorative film and/or the winding-on roll. The optical markings can be read/detected for example by optical sensors which are part of the transport device. The mechanical markings can be for example in the form of transport perforations which are in register relationship with a decorative printing and into which engages a toothed roller cooperating with a stepping drive. Register-accurate decoration on the injection-molded plastic parts can be achieved by matching the film transport device and/or the winding-on roll with the position of the mold recesses of the mold inserts.

That therefore shows that the aforementioned object is attained with the subject-matter of main apparatus claim 1 and the claims appendant thereto.

It is now shown hereinafter that the aforementioned object is also attained with the subject-matter of the method according to the present invention. The subject-matter of the method of the present invention involves an in-mold decoration method using an apparatus which has an injection tool including a first tool portion having a first mold recess and a second tool portion wherein the first or the second tool portion has an injection passage and the following steps are cyclically performed:

a) providing a portion of the decorative film on the first tool portion or the second tool portion in such a way that when the injection tool is closed the decorative film lies on an end face of the raised edge region which delimits the first mold recess and which extends around the mold recess, b) closing the injection tool to such an extent that in the region of the end face of the raised edge region between the first tool portion and the second tool portion there is a gap between the end face of the raised edge region of the first tool portion and the corresponding end face of the second tool portion at least over a subregion and the gap is sealed off by the interposed decorative film which is pinched in the region of the gap, c) injecting a plastic melt through the injection passage into the injection tool, wherein the plastic melt is injected behind the decorative film in the region surrounded by the raised edge region without plastic melt passing through the sealed gap so that a decorated plastic part is produced, d) opening the injection tool by moving the first and second tool portions relatively away from each other and removing the decorated plastic part from the injection tool, and e) removing the residual portion of the decorative film and preparing a further portion of the decorative film.

That method is distinguished, in accordance with the foregoing description relating to the subject-matter of main apparatus claim 1, insofar as the tool wear of the tool integrated in the injection mold for severing the decorative film by to pinching is markedly reduced and at the same time as a result the amount of time required for each injection-molded plastic part is reduced, that is to say this affords the possibility of reducing the cycle time and increasing the number of cycles in the production procedure. When the injection tool is closed the decorative film is pinched between the continuously extending raised edge region of the first tool portion and the corresponding surface region of the second tool portion and in that case can be partially or completely severed. Severing of the decorative film can be effected in the form of a shearing effect primarily in conjunction with pinching. Severing however is not necessarily required. It is essential that, upon closure, the two tool portions at least region-wise form a gap in which the decorative film is compressed, that is to say squeezed or pinched, and possibly at least partially severed immediately upon closure of the tool and in particular the gap is sealed off by the compressed decorative film in the closed position of the injection tool. In that respect the gap is sealed off to such an extent that the gap is sealingly closed upon injection of the plastic melt so that the plastic melt which is injected into the injection tool cannot escape.

It can be provided that upon pinching and possibly severing of the decorative film in step b) the decorative film is compressed to less than 50% of its thickness, preferably to between 20% and 10% of its thickness. In that method step, besides compression of the decorative film, the decorative film can be torn and thus partially severed, wherein the degree of severing is dependent on the material involved, as described hereinbefore. In that respect the elasticity of the material of the decorative film plays an important part, that is to say it is possible that the decorative film is plastically deformed or compressed or the decorative film is at least partially elastically deformed.

In preferred embodiments of the method according to the invention it can be provided that in step b) the decorative film is at least partially severed by pinching and/or severing upon the cooperation of the raised edge region of the mold recess of the first tool portion with the corresponding end face of the second tool portion.

It can further be provided that the raised edge region of the first tool portion is at least region-wise in the form of a stamping edge.

In a further advantageous configuration it can be provided that in step d) the decorative film adheres to the plastic part which is produced by plastic material being injected therebehind and, insofar as it is not yet completely severed at the edge, it is completely severed in step d). As described hereinbefore complete severing in step d) can be described substantially as a tearing operation.

It can further be provided that in step a) the decorative film is so arranged that its decoration is facing away from the plastic melt injected in step c). That arrangement affords the advantage that the decoration can be formed by materials which could react with the plastic melt in step c), for example they can dissolve each other or become attached by partial dissolving. Upon injection of the plastic melt in step c) the comparatively thick material layer of the decorative film protects the decoration.

When using an at least partially and/or region-wise transparent or translucent plastic melt and a decorative layer which is appropriately well resistant to the action of the plastic melt, the decoration can also be arranged on the side of the decorative film, that is towards the plastic melt, or also on the side of the decorative film, that is towards the plastic melt and the side of the decorative film that is away from the plastic melt. Injection-molded plastic parts which are decorated on two sides can be produced in that way. In that fashion, one side of the injection-molded plastic part is directly decorated and the other side from the rear side, wherein the rear-side decoration can be entirely or partially visible through the injection-molded plastic layer.

When simultaneously using a transparent decorative film it is also possible to achieve three-dimensional effects by specifically targeted superimposition of two identical or almost identical decorations in two mutually superposed planes on the front and rear sides of the decorative film.

It can preferably be provided that a lamination film is used as the decorative film.

It has proven worthwhile to use a single-layer lamination film, wherein the term "single-layer lamination film" includes colored layers or colored pigment layers applied to the lamination film or adhesive layers or protective lacquer layers or metal layers or polymer layers of conductive, semiconducting or non-conducting polymer.

Preferably the single-layer lamination film does not have an adhesive layer.

It can be provided that the lamination film is a plastic film, preferably a PET film or a film of polystyrene, ABS or PMMA. The plastic film can be in the form of a smooth or structured film. It is for example possible for the plastic film to simulate a leather surface with the typical leather grain which can be perceived tactilely or haptically. The structures however may also be present in orders of magnitude (microscopic, submicroscopic) which are not tactilely perceptible, for example optical structures having a diffractive or refractive action.

It can also be provided that the lamination film is of paper or has paper layers. As tests have shown copy paper can also be used so that the kind of paper is not limited. It will be noted however that tests must decide the thickness with which the paper can be used.

It is also possible for the lamination film to be a knitted fabric of natural fibers and/or synthetic fibers. The term "knitted fabric" is here used to mean that the fibers form an interconnected flat structure, wherein the fibers can be held together by felting, weaving and/or gluing. Finally the aforementioned material paper can also be produced in that way and thus papers of different kinds of fibers can be used.

In addition the lamination film can also be made from other materials, in particular natural substances such as leather, parchment or wood veneer.

It has proven desirable if the lamination film has a stretchability in the range of between 12% and 20%, preferably in the range of between 15% and 20%. In that respect the stretchability required for good processability is determined by the surface geometry of the injection-molded plastic part. The greater the curvature and/or the more complexity of the injection-molded plastic part, the more stretchability is correspondingly required.

It is further desirable if the lamination film is of a thickness in the range of between 20 μm and 500 μm.

It has provision worthwhile if the spacing between the end face of the raised edge region of the first tool portion and the corresponding end face of the second tool portion is in the range of between 20% and 10% of the thickness of the decorative film, as stated hereinbefore.

It has proven worthwhile if the plastic melt injected in step c) has polystyrene. It is however also possible to use other thermoplastic materials such as for example ABS, ABS-PC, PMMA, PET and PET-PC.

BRIEF DESCRIPTION OF THE DRAWINGS

The invention will now be described in greater detail by means of embodiments by way of example. In the drawing.

DETAILED DESCRIPTION OF THE INVENTION

Figure 1:
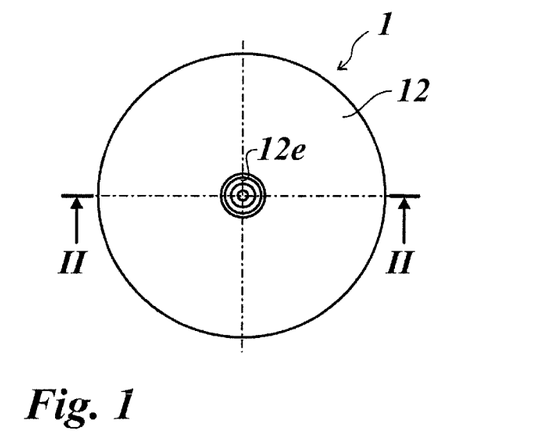
FIG. 1 shows a plan view of an injection tool according to the invention.

FIG. 1 shows an injection tool 1 which is fitted into an apparatus for performing the in-mold decoration method. The term in-mold decoration is used to denote a method of decorating injection-molded plastic parts in which a decorative film is placed in an injection tool and then has plastic material injected therebehind. That definition applies both for the method used in relation to the present invention and also for the known conventional in-mold methods. Unlike the method according to the invention, the conventional method provides that the decorative film is stamped out by stamping edges which come into contact with each other, and optionally pre-shaped, if non-flat surfaces of the injection-molded plastic part are to be decorated. In preferred conventional configurations involving a transfer film only layers of the decorative film are transferred onto the injection-molded plastic part, for example a print image, that is to say one or more color layers which can be arranged on a transparent protective layer. For that purpose in those conventional methods, relatively expensive transfer films are used.

Figure 2:
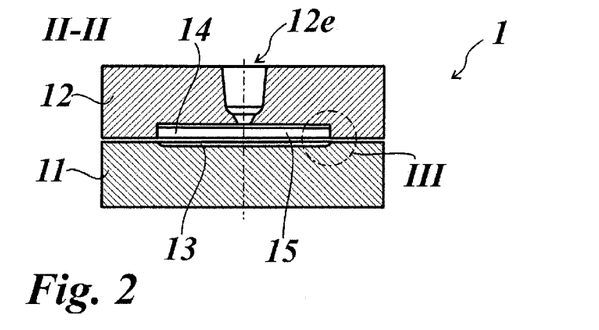
FIG. 2 shows a view of the FIG. 1 injection tool in section along section line II-II.

Of the injection tool 1 according to the invention the Figures only show the mold inserts. As FIG. 2 shows the injection tool 1 has a movable mold insert 11 with a first mold recess 13 and a fixed mold insert 12 with a second mold recess 15, the fixed mold insert 12 being provided with an injection passage 12e.

Figure 3:
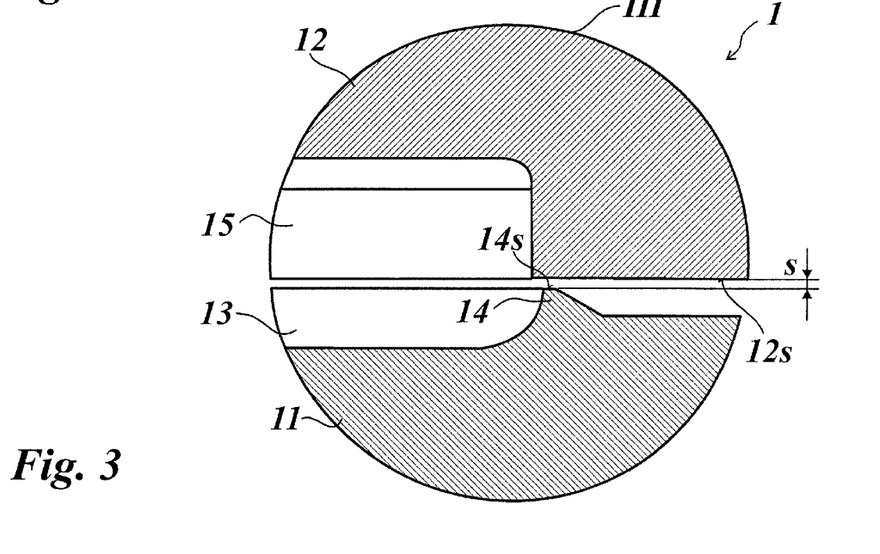
FIG. 3 shows a view on an enlarged scale of a detail III in FIG. 2.

FIG. 3 shows a detail view on an enlarged scale of the configuration of the two mold inserts 11 and 12 of the injection tool 1.

A first mold recess 13 is provided in the movable mold insert 11, the mold recess being defined by a ring-shaped edge region 14. The ring-shaped edge region 14 has a flat ring-shaped end face 14s. In the outer edge portion adjoining the edge region 14 the end face of the movable mold half 12 is set back so that only the end face 14s of the edge portion 14 forms a contact surface for the decorative film 16 placed in the injection tool 1 (see FIG. 4).

The fixed mold insert 12 has a flat end face 12s extending parallel to the end face 14s of the edge portion 14 of the movable mold insert 11. In the closed injection tool 1, a gap remains between the end face 12s and the end face 14s, the gap being of a width s which in the FIG. 3 example can be between 20 μm and 50 μm. The gap width s is advantageously so selected that it is in the range of between 10% and 20% of the thickness of the uncompressed decorative film 16. The smallest possible value is determined by the production tolerances of the two mold inserts 11 and 12.

Figure 4:
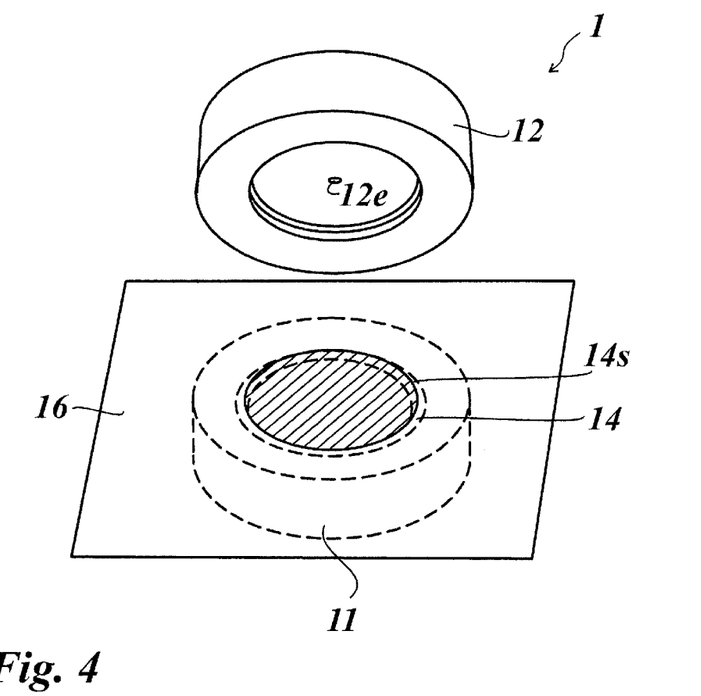
FIG. 4 shows a perspective exploded view of the FIG. 1 apparatus.

FIG. 4 shows an exploded perspective view of the open injection tool 1 with an inserted portion of the decorative film 16. The subportion of the decorative film 16, that is required for decoration, is emphasized by hatching.

The decorative film 16 is an endless film which is provided on a supply roll and which can be fed by a transport device (not shown).

Figure 5:
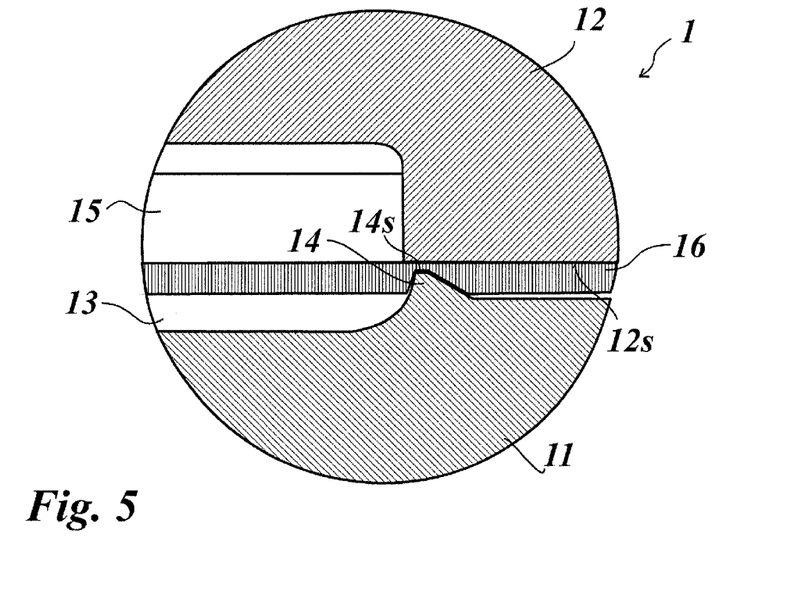
FIG. 5 shows the detail III in FIG. 2 with inserted decorative film.

If now as shown in FIG. 5 the injection tool 1 is closed with the decorative film 16 inserted therein, by the movable mold insert 11 being moved in the direction of the fixed mold insert 12, the decorative film 16 is pinched and partially severed in the region of the end face 14s of the edge region 14 of the movable mold insert 11.

Figure 6:
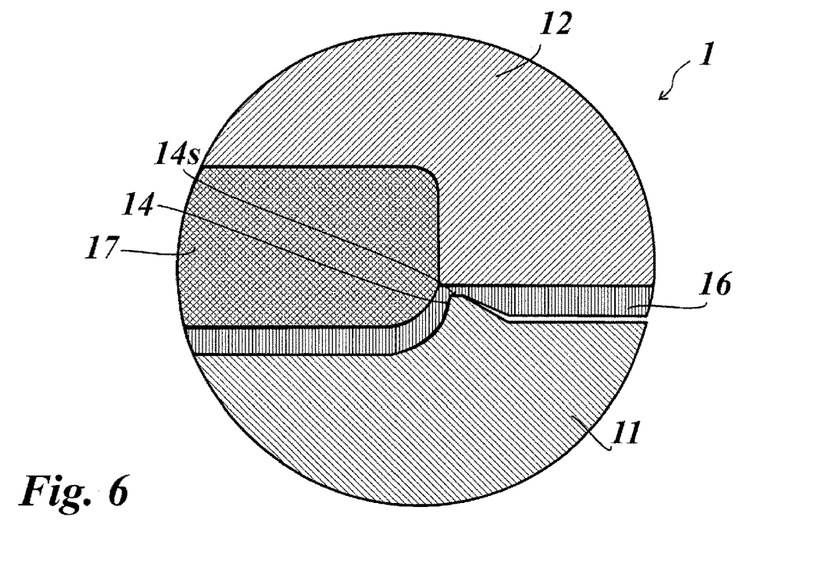
FIG. 6 shows the detail III in FIG. 2 with decorative film with plastic material injected therebehind.

Now, as shown in FIG. 6, a plastic melt 17 is injected behind the decorative film 16, wherein, as a consequence of the injection pressure of the plastic melt which is injected into the second mold recess 15, the decorative film 16 comes to bear against the inside wall of the first mold recess 13 of the injection tool 1. It is essential that the gap remaining when the tool is closed, between the mold inserts 11 and 12, is sealed off by the interposed decorative film, that is to say it is sealingly closed at least to such an extent that no plastic melt can escape through the gap.

The decorative film 16 is preferably fitted into the injection tool 1 in each case in such a way that the decorative side faces away from the injected plastic melt 17s. With that arrangement, no reactions between the decorative layer and the plastic melt 17s occur, as would be possible in the case of the conventional in-mold decoration method in which the decorative layer is towards the plastic melt. Advantageously the decorative film 16 can be a lamination film which for example can involve a PET film but also printed paper, knitted fabric of natural fibers or synthetic fibers or natural materials such as leather or parchment. The thickness of the lamination film can be in the range of between 20 μm and 500 μm but a preferred thickness is one which makes it possible for the gap width s of the closed injection tool 1 to be set in the range of between 10 and 20% of the thickness of the decorative film 16. It will be noted however that it has been found in tests that it is also possible to process decorative films whose thickness approximately corresponds to the gap width s. An essential material parameter of the decorative film 16 is stretchability which, depending on the material used, should advantageously be in the range of between 12% and 20%, preferably in the range of between 15% and 20%. A stretchability of about 20% for example has proven desirable for PET films.

Figure 7:
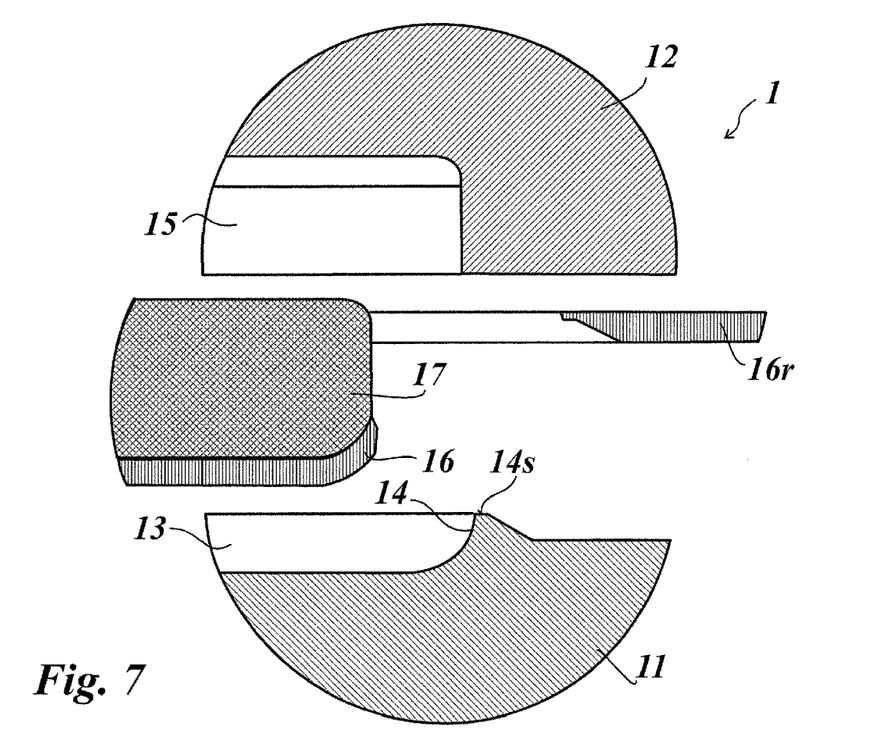
FIG. 7 shows the detail HI in FIG. 3 with the injection tool opened.

FIG. 7 shows the injection tool which is opened after the injected plastic melt 17s has become cold and from which it is possible to remove an injection-molded plastic part 17 which is decorated with the decorative film 16. In the region of the end face 14s of the ring-shaped edge region 14n of the movable mold insert, in particular due to previous squeezing of the decorative film 16, the decorative film 16 has a desired-fracture location whereby there remains a residual portion 16r of the decorative film 16, which can be wound onto a winding-on roll. Depending on the respective nature of the decoration and the configuration of the injection-molded plastic part 17, it is possible to provide auxiliary devices for feeding the decorative film in accurate register relationship and positioning it in the injection tool 1 in accurate register relationship. The injection-molded plastic part 17 can be for example a housing top part of an electronic device in which a display and keys are to be decorated, for which reason deviations in position between the decoration and the housing top part are definitely to be avoided. The injection-molded plastic part 17 can also be for example an individual part which is a component part of an end product made up of a plurality of individual parts and wherein the decorations on the individual parts, when brought together, give a preferably almost seamless composite overall decoration. The overall decoration can be for example an endless decoration (for example a regular endless pattern or an irregular veneer) or an individual image decoration (for example a painting, an embellishment or an ornament, or a pattern).

The end product can be for example a building kit, in particular a model kit, for example for a toy. In that case the individual part can be a part of that kit.

LIST OF REFERENCES 1 injection tool
11 movable mold half
12 fixed mold half
12e injection passage
12s end face
13 first mold recess
14 ring-shaped edge region
14s end face
15 second mold recess
16 decorative film
16r residual portion
17 injection-molded plastic part
17s plastic melt

The invention claimed is:

1. A method for providing a decoration on a non-flat surface of an injected molded part, the method comprising:
   a) providing an injection molding apparatus comprising an injection tool, a supply roll disposed upstream of the injection apparatus and a winding-on roll disposed downstream of the injection tool, the injection tool including a first tool portion having a first mold recess defining a non-flat surface and a second tool portion, wherein the first or the second tool portion has an injection passage, the supply roll including a stretchable decorative film having a stretchability in the range of between 12% and 20% and being provided in the form of a strip-shaped endless film wound on a reel, and the winding-on roll including a reel for winding on a residual portion of the decorative film;
   b) unwinding the decorative film from the reel of the supply roll in a flat sheet form such that the decorative film is not pre-shaped to conform to the mold recess;
   c) positioning a portion of the unwound flat decorative film on the first tool portion or the second tool portion in such a way that, when the injection tool is closed, the decorative film lies on an end face of a raised edge region which delimits the first mold recess and which extends continuously around the mold recess;
   d) closing the injection tool to such an extent that, in the region of the end face of the raised edge region between the first tool portion and the second tool portion, there is a gap between the end face of the raised edge region of the first tool portion and a corresponding end face of the second tool portion and the gap is sealed off by the interposed decorative film which is pinched in the region of the gap, wherein the two tool portions do not come into contact in the region of the end face of the continuously extending edge region of the first tool portion, and wherein, upon pinching of the decorative film, the film is compressed to between 10% and 50% of its thickness;
   e) injecting a plastic melt through the injection passage into the injection tool, wherein the plastic melt is injected behind the decorative film in the region surrounded by the raised edge region without plastic melt passing through the sealed gap such that the decorative film is pressed against the non-flat surface of the mold recess;
   f) opening the injection tool by moving the first and second tool portions relatively away from each other whereby a portion of the decorative film is adhered to the plastic melt to form a plastic part with a decorated non-flat surface and a residual portion of the decorative film;
   g) removing the decorated plastic part from the injection tool leaving the residual portion of the decorative film; and
   h) winding the residual portion of the decorative film onto the winding-on roll.

2. A method as set forth in claim 1, wherein, in step d), the decorative film is firstly partially severed by pinching upon cooperation of the raised edge region of the mold recess of the first tool portion with the corresponding end face of the second tool portion.

3. A method as set forth in claim 1, wherein the raised edge region of the first tool portion is at least region-wise in the form of a stamping edge.

4. A method as set forth in claim 1, wherein, in step c), the decorative film is so arranged that a decoration of the decorative film is remote from the plastic melt which is injected in step.

5. A method as set forth in claim 1, wherein a knitted fabric of natural fibers and/or synthetic fibers and/or paper is used as the decorative film.

6. A method as set forth in claim 1, wherein an at least partially and/or region-wise transparent or translucent plastic melt is used.

7. A method as set forth in claim 1, wherein the decorative film is of a thickness in the range of between 20 μm and 500 μm.

* * * * *

UNITED STATES PATENT AND TRADEMARK OFFICE
CERTIFICATE OF CORRECTION

PATENT NO.          : 10,155,329 B2
APPLICATION NO.     : 15/285121
DATED               : October 4, 2016
INVENTOR(S)         : Harald Burger and Martin Hahn Page 1 of 1

It is certified that error appears in the above-identified patent and that said Letters Patent is hereby corrected as shown below:

In Column 10, Line 41:
Now reads: "which is injected in step."
Should read: "which is injected in step e."

Signed and Sealed this
Seventeenth Day of September, 2019

Andrei Iancu
*Director of the United States Patent and Trademark Office*